United States Patent [19]
Pollman et al.

[11] 3,855,793
[45] Dec. 24, 1974

[54] TRANSMISSION RATIO CONTROL SYSTEM

[75] Inventors: Frederic W. Pollman, Ames; David W. Reynolds, Huxley; William A. Ross; George A. Schauer, both of Ames, all of Iowa

[73] Assignee: Sundstrand Corporation, Rockford, Ill.

[22] Filed: Apr. 19, 1973

[21] Appl. No.: 352,660

[52] U.S. Cl............................ 60/431, 60/445, 60/449
[51] Int. Cl..................................................... F16h 39/46
[58] Field of Search............ 60/19, 423, 431, 445, 449

[56] References Cited
UNITED STATES PATENTS

| | | | |
|---|---|---|---|
| 3,442,153 | 5/1969 | Ross | 60/19 |
| 3,583,154 | 6/1971 | Utter | 60/19 |

*Primary Examiner*—Martin P. Schwadron
*Assistant Examiner*—H. Burks, Sr.
*Attorney, Agent, or Firm*—Wegner, Stellman, McCord, Wiles & Wood

[57] ABSTRACT

A transmission ratio control system including an engine having fuel supply means for controlling engine horsepower, a hydrostatic transmission driven by the engine including means for varying transmission ratio, a ratio control valve for controlling the ratio varying means, means for applying a bias to the ratio control valve proportional to engine speed, and means for applying an opposing fluid bias to the ratio control valve proportional to engine horsepower. In operation, the fuel supply means calls for a predetermined engine horsepower, and the transmission ratio is varied to provide a predetermined speed corresponding to minimum fuel consumption. Alternative to the horsepower signal supplied to the ratio control valve, a brake valve is provided to utilize the engine for vehicle braking. In conjunction with the brake valve, a switching valve disables the horsepower signal when the brake valve is employed.

29 Claims, 5 Drawing Figures

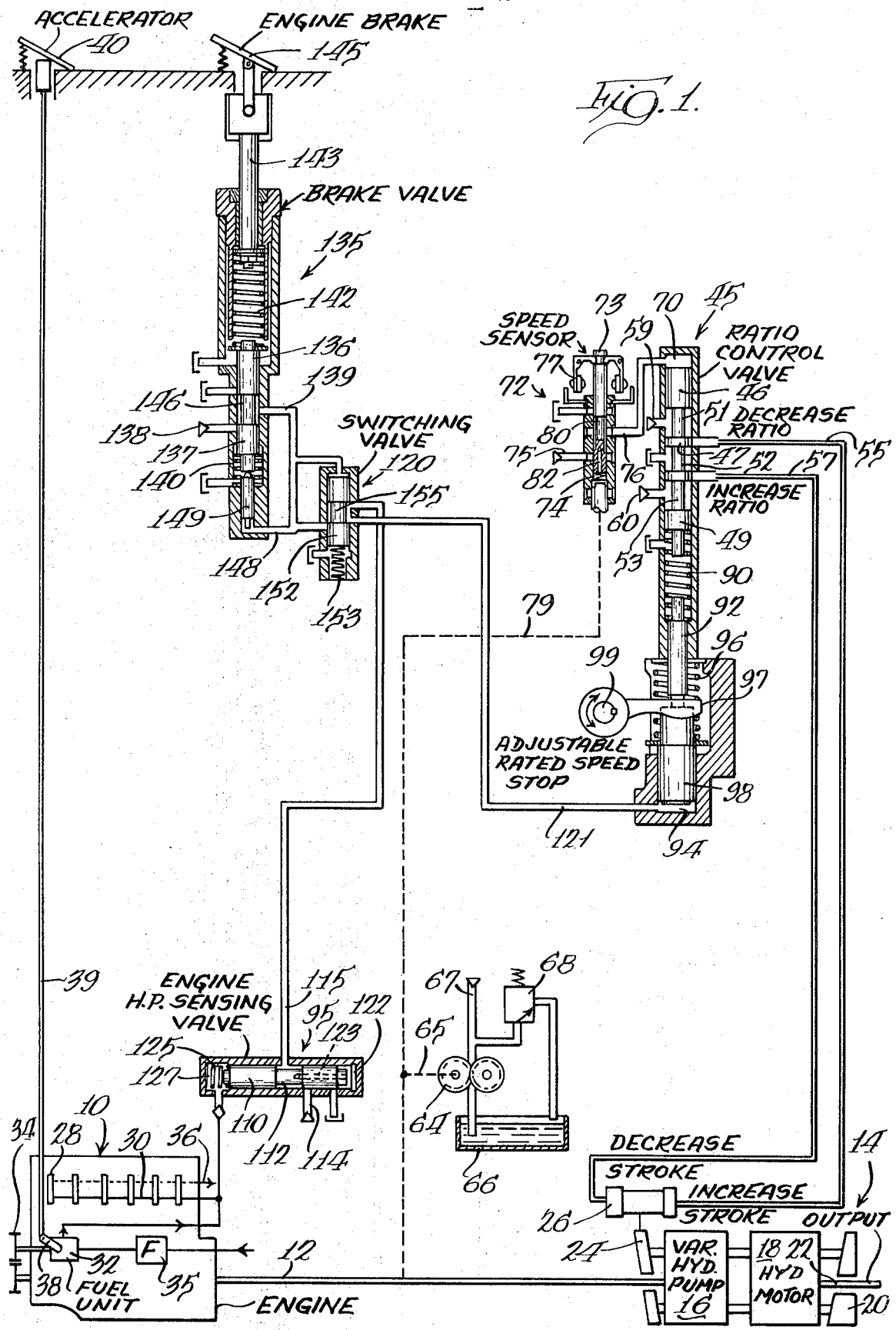

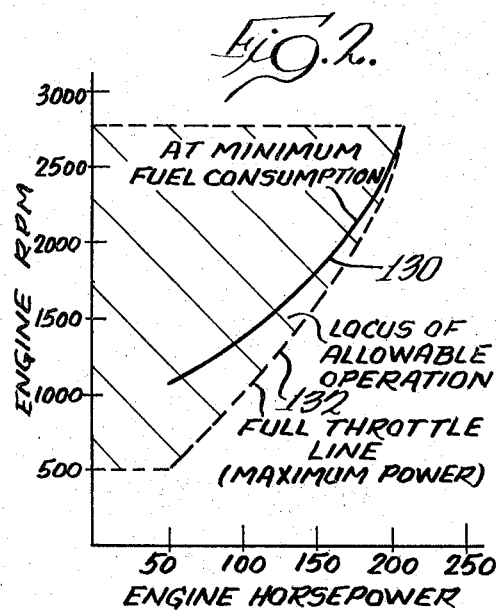
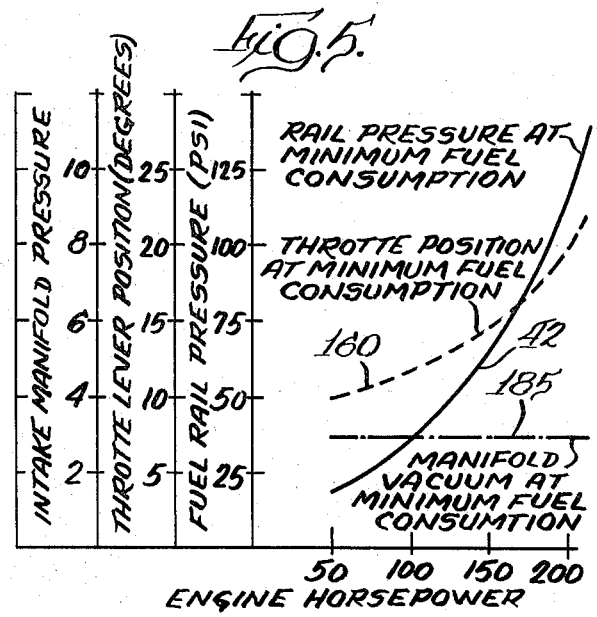
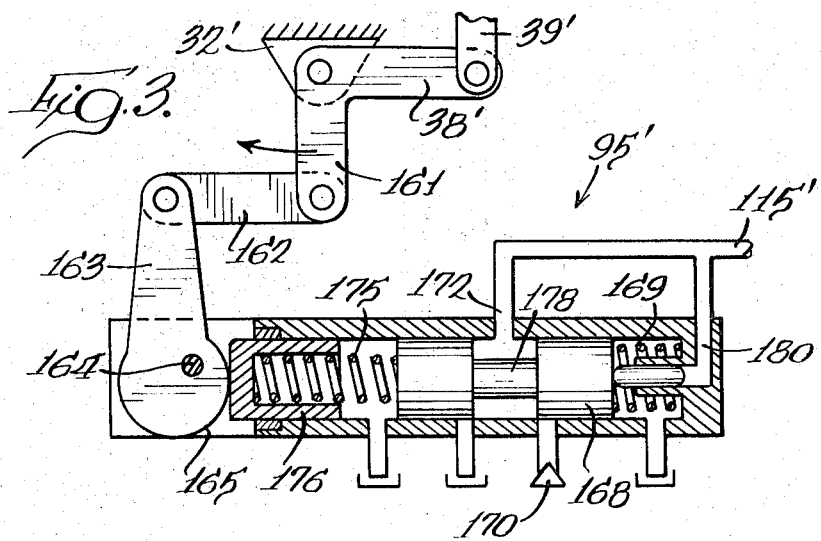
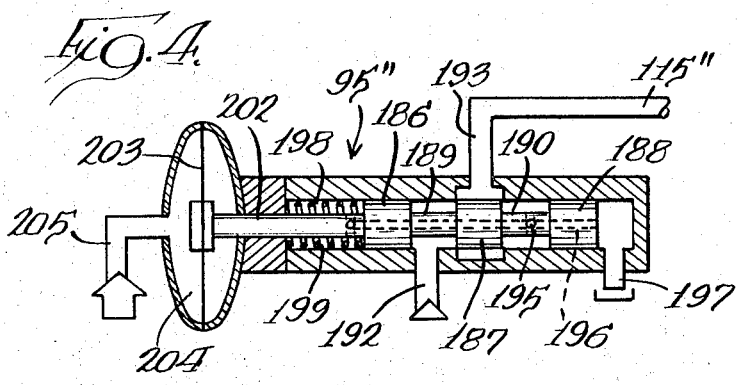

3,855,793

TRANSMISSION RATIO CONTROL SYSTEM

BACKGROUND OF THE INVENTION

The present invention relates to a transmission ratio control system in which engine horsepower is established by a manually controllable fuel supply means, and a hydrostatic transmission ratio is varied to provide predetermined engine speeds in which minimum fuel is consumed.

An infinitely variable ratio power transmission device such as a hydrostatic or hydromechanical transmission is capable of adapting variable input speeds to variable output speeds in any combination over the operating range of the transmission and engine. When such transmissions are installed in conjunction with a variable speed engine in a mobile vehicle such as a truck or tractor, it is often desirable to operate the engine at various regulated speeds which are dependent on horsepower demand in order to obtain certain operating characteristics such as maximum fuel economy, maximum power or maximum engine life. Engine speed can be controlled by a ratio control valve responsive to engine speed and responsive to engine horsepower in a manner to vary the transmission ratio to control the engine speed for minimum fuel consumption for predetermined power requirement.

In the prior application of Nyman et al., Ser. No. 171,925, filed Aug. 16, 1971, now U.S. Pat. No. 3,733,931 and assigned to the assignee of this application, a hydrostatic transmission ratio is controlled in a hydromechanical drive by a ratio control valve which is responsive to an engine speed signal and a mechanically applied horsepower signal. In U.S. Pat. No. 3,583,154, a hydrostatic transmission ratio is controlled by a ratio control valve which is responsive to an engine speed signal and responsive to a mechanically applied torque signal.

It would be desirable to provide a transmission ratio control in which the horsepower signal to the ratio control valve is a fluid signal rather than a mechanical signal.

SUMMARY OF THE INVENTION

It is a general object of the present invention to provide a new and improved transmission ratio control system utilizing a horsepower sensing means to provide a fluid signal to the ratio control valve in a manner to obviate the need for mechanical linkage which is expensive, difficult to install, and difficult to maintain in proper adjustment.

A more specific object of the invention is to provide a new and improved transmission ratio control system utilizing an infinitely variable ratio hydrostatic transmission to automatically maintain a predetermined relationship between engine speed and engine horsepower over the entire operating range of the engine, transmission, and vehicle, by means of hydraulic pressure signals applied to a ratio control valve. The hydraulic pressure signals are analog values corresponding to engine speed and engine horsepower, and are applied to the ratio control valve in predetermined proportions. The use of hydraulic signals reduces the problems of installation, adjustement and malfunction which are often associated with mechanical systems, and ususally will prove less expensive and more reliable than electrical systems.

The ratio control valve controls the flow of fluid relative to a displacement varying means for controlling displacement of a pump in the hydrostatic transmission. The ratio control valve is controlled by a speed signal applied to one end and a horsepower signal applied to the opposite end. The engine speed signal may be supplied by a flyweight-operated valve. The horsepower signal is supplied through a spring actuated by a plunger supplied with fluid from a horsepower sensing valve. Spring rates and cylinder diameters are selected to provide a predetermined desired desired relationship of speed to horsepower. A typical speed to horsepower relationship is illustrated by graph. Preferably, an adjustable stop is utilized to limit travel of the horsepower plunger in the ratio control valve, in order to limit the maximum horsepower signal, and thereby effectively limit maximum engine speed.

The engine horsepower signal is supplied to the ratio control valve by means of an engine horsepower sensing valve which may be operated in various ways. For example, on certain diesel engines, the fuel delivery pressure is regulated in a manner such that fuel pressure is proportional to engine horsepower. In internal combustion engines, the throttle lever position varies with horsepower at different speeds. In a naturally aspirated gasoline engine, intake manifold vacuum may be utilized as a horsepower signal to the horsepower sensing valve.

In order to utilize the engine for braking the vehicle, a braking valve is preferably provided for purposes of supplying a horsepower signal to the ratio control valve during a braking situation when the accelerator is released, alternative to the horsepower signal supplied by the horsepower sensing valve during accelerating conditions.

Preferably, the braking valve is controlled by a spring actuated by a manually controlled plunger, and a feedback signal acts on the valve in opposition to the manually compressed spring. A switching valve is utilized between the horsepower sensing valve and the ratio control valve to normally disable the braking valve during an accelerating situtation, and alternatively to disable the horsepower sensing valve during a braking situation.

In a preferred system disclosed herein, a manually accessible accelrator pedal is utilized to control fuel supply to a diesel engine in which fuel rail pressure is proportional to engine power, and a horsepower sensing valve is responsive to fuel rail pressure to control the horsepower signal supplied to the ratio control valve. Alternative embodiments illustrate horsepower sensing valves responsive to gasoline engine throttle position and responsive to gasoline engine intake manifold vacuum.

BRIEF DESCRIPTION OF THE DRAWINGS

FIG. 1 is a diagrammatic illustration of a transmission ratio control system embodying the principles of the present invention in association with a diesel engine;

FIG. 2 is a graph including a cruve illustrating predetermined engine speeds compared to horsepower values at minimum fuel consumption;

FIG. 3 illustrates an alternative horsepower sensing valve responsive to throttle position in a gasoline engine or rack-type fuel injection diesel engine;

FIG. 4 illustrates an alternative horsepower sensing valve responsive to intake manifold vacuum in a gasoline engine; and FIG. 5 is a graph with curves illustrating the relationship of horsepower to the values utilized in FIGS. 1, 3 and 4 for representing horsepower input to the horsepower sensing valve.

DETAILED DESCRIPTION OF PREFERRED EMBODIMENT

Referring now to FIG. 1, an engine 10 includes a drive shaft 12 appropriately connected to drive an input shaft for a hydrostatic transmission 14. As illustrated diagramatically, the hydrostatic transmission 14 includes a variable displacement hydraulic pump 16 connected in closed hydraulic circuit with a fixed displacement hydraulic motor 18. Preferably, the pump and motor are axial piston devices of conventional construction in which axially disposed cylinders arranged in an annular series concentric around the axis of rotation receive reciprocal pistons controlled by angularly disposed cam surfaces. As illustrated, the hydraulic motor 18 includes a fixed cam or swashplate 20, and the motor drives an output shaft 22. The pump 16 includes a variable angle cam or swashplate 24, which tends to seek a minimum pressure position as described in the aforementioned application Ser. No. 171,925. The swashplate is controlled by a double acting fluid operated piston and cylinder device 26. Admission of control fluid to opposite ends of the piston and cylinder device 26 is controlled to vary the angle of the cam 24 and thereby vary the displacement of the pump 16 to vary the transmission ratio. As utilized herein, the term "ratio" is used to mean the ratio of input speed to output speed. Thus, the term "increase transmission ratio" means to increase input speed relative to output speed, while the term "decrease transmission ratio" means to decrease input speed relative to output speed.

The engine 10 illustrated diagrammatically in FIG. 1 is representative of a commercially available diesel engine in which fuel injectors 28 for each of a plurality of cylinders are supplied with fuel through a fuel rail line 30 from a fuel unit 32 including a pump driven by the engine 10 through gearing as illustrated at 34. Fuel is supplied to the fuel unit 32 through a filter 35 which communicates with a tank not illustrated. Excess fuel from the injectors 28 is returned to the tank through a return line 36. In operation, as is well known, the pump in the fuel unit 32 is driven by the engine 10 to supply fuel under pressure to the injectors 28. The quantity of fuel utilized in each cylinder is controlled by the injectors. The pressure of fluid delivered to the injectors is controlled by a throttle mechanism associated with the fuel pump, and illustrated diagrammatically as including a lever 38 controlled by a link 39 in turn operated by a manually accessible accelerator pedal 40. In such systems, the accelerator pedal is utilized to control the throttle in a manner to establish a predetermined engine horsepower capacity which varies in proportion to the variation in fuel pressure in the fuel rail line 30. The relationship of fuel rail pressure to engine horsepower at minimum fuel consumption throughout the range of horsepower operation is illustrated in a solid line curve 42 in FIG. 5 for an exemplary engine having a rated capacity on the order of 210 horsepower.

In order to control the displacement varying piston and cylinder device 26, a ratio control valve 45 includes a valve member with spaced land portions 46, 47, 48 and 49, and intervening reduced stem portions 51, 52 and 53. The ratio control valve stem is normally positioned as illustrated in FIG. 1 so that the land 47 blocks a passage 55 communicating with one side of the piston and cylinder device 26 for increasing the stroke of the variable displacement pump, while valve land 48 blocks a passage 57 communicating with the opposite end of the piston and cylinder device where pressure is supplied for decreasing the stroke of the pump 16. In order to supply fluid under pressure to the displacement varying means, control fluid is made available at port 59 communicating with the reduced stem portion 51, and a port 60 communicating with reduced stem portion 53. In operation, if the ratio control valve stem is moved downwardly, the control port 55 is communicated with supply port 59 through reduced stem portion 51, while the control port 57 is communicated with drain through reduced stem portion 52. Conversely, if the ratio control valve stem is moved upwardly, the control port 57 communicates with supply port 60 through reduced stem portion 53, while the control port 55 communicates with drain through the reduced stem portion 52.

Control fluid is supplied to the system by means of a charge pump illustrated diagramatically at 64. Preferably, the pump 64 is driven by the engine as indicated diagrammatically by broken line 65. The charge pump draws fluid from a reservoir as at 66 and supplies fluid under pressure to a supply line 67 which communicates with various supply ports in the valve mechanisms. Excess fluid from the pump 64 is returned to the reservoir 66 over a relief valve 68.

The upper end of the ratio control valve receives a speed signal in a chamber 70 from a speed sensor valve 72 adapted to provide a signal proportional to engine speed. Preferably the speed sensor valve includes a longitudinally movable valve stem 73 normally biased by a spring 74 upwardly to the position illustrated where communication is blocked between a supply port 75 and a control port 76 leading to the chamber 70 in the ratio control valve. In operation, rotary flyweights 77 are driven by means indicated diagrammatically at 79 at a speed proportional to engine speed. As the engine speed increases, he fly-weights are adapted to move outwardly, to move the valve stem 73 downwardly in a direction where a reduced stem portion 80 places the supply port 75 in communication with the control port 76. The reduced stem portion 80 communicates with the chamber housing spring 74 through a longitudinal internal passage 82.

A horsepower signal is supplied to the lower end of the ratio control valve stem by means of a coiled compression spring 90 which is engaged by a reciprocal plunger 92 having an end portion disposed in a fluid chamber 94 to which fluid under pressure is supplied by means of an engine horsepower sensing valve 95. The plunger 92 is urged downwardly in the chamber 94 by means of a coiled compression spring 96 which has sufficient strength to provide a predetermined delay factor requiring predetermined pressure buildup in the chamber 94 before movement of the plunger 92 occurs. Movement of the plunger 92 upwardly in a direction to apply a horsepower signal to the ratio control valve is limited by means of an adjustable stop in the form of a yoke 97 which straddles the plunger and is engageable with an enlarged plunger portion 98 in a manner to limit the maximum horsepower signal, and in turn effectively limit the maximum engine speed. The yoke 97 is mounted on an angularly adjustable shaft 99 which may be utilized to vary the maximum setting under appropriate conditions.

The engine horsepower sensing valve 95 comprises a longitudinally movable valve stem 110 having a reduced central portion 112 adapted to provide communication between a supply port 114 and a control port 115. In turn, the control port 115 communicates through a switching valve 120 with a port 121 leading to the fluid chamber 94 in the ratio control valve. The reduced stem portion 112 in the horsepower sensing valve communicates with a fluid chamber 122 at the right end of the stem through a central longitudinal passage 123. At the left end of the valve stem 110, a fluid chamber 125 communicates with the engine fuel rail line 30 so that the left end of the valve member 110 is subjected to fuel pressures which vary proportionally with horsepower capacity in the engine 10. Preferably, the fuel pressure in the chamber 125 is always somewhat less than the fluid pressure at the reduced stem portion 112, so that any leakage of fluid at the interface between the fuel system and the hydraulic system is toward the fuel system. In order to aid the fuel pressure in the chamber 125, a coiled compression spring 127 is positioned in the chamber 125 and urges the valve stem 110 toward the right.

In operation of the system as thus far described, the transmission is put into operation by first starting the engine 10 and depressing the accelerator pedal 40 in a manner to call for a predetermined engine power capacity. Operation of the engine results in rotation of the flyweight assembly 77 in the speed sensor valve. As the engine speed increases, the speed sensor valve stem is moved downwardly to a position where the reduced stem portion 80 supplies fluid from the supply port 75 to the chamber 70 in the ratio control valve. The ratio control valve stem is moved downwardly to a position where the reduced stem portion 51 communicates the supply port 59 with control port 55 to place the pump 16 into stroke. In this manner, the pump is conditioned to drive the motor 18 and rotate the output shaft 22, placing the vehicle in motion. When the depressed accelerator pedal 40 calls for predetermined fuel pressure in the fuel rail line 30, the fuel rail pressure signal is supplied to the left end of the horsepower sensing valve stem 110. As a result of the fuel pressure, the valve stem 110 is moved toward the right where the supply port 114 communicates with the control port 115, to supply fluid pressure to the chamber 94 in the ratio control valve. Due to the strength of the spring 96, the horsepower signal supplied to the lower end of the plunger 92 is delayed in affecting the ratio control valve until the transmission is put into operation. Ultimately, however, the horsepower sensing valve supplies a signal to the ratio control valve proportional to engine power, while the speed sensor valve supplies a speed signal to the ratio control valve proportional to engine speed. The signals are compared in the ratio control valve in a manner to control the hydrostatic transmission so as to impose a load on the engine which controls the engine speed to correspond to that desired for minimum fuel consumption for the corresponding horsepower capacity. As the stroke of the pump is increased, the load on the engine is increased, and ultimately the speed of the engine is controlled by the load.

When the speed signal and the horsepower signal reach equilibrium values, the ratio control valve moves to a position substantially as illustrated in FIG. 1 where the control ports 55 and 57 are blocked by the valve lands 47 and 48.

If the speed of the engine should fall below that which is desired, the speed signal at the top of the ratio control valve would be reduced in value, as a result of which the valve stem moves upwardly in the ratio control valve, porting fluid from the supply port 60 to the control port 57 to decrease the stroke of the pump in the hydrostatic transmission, thereby reducing the load on the engine, which should result in increasing the engine speed to that desired.

Conversely, if the engine should tend to overspeed, the valve stem in the ratio control valve is moved downwardly to increase the stroke of the pump, thereby increasing the load on the engine, with the expectation that the engine speed would be lowered to that desired.

If the accelerator pedal is released without taking braking action, there is little braking effect. The horsepower signal to the ratio control valve is discontinued by releasing the accelerator pedal 40. The momentum of the vehicle drives the fixed unit 18 as a pump, while the variable unit functions as a motor. Some speed signal continues due to coasting of the vehicle, and this signal moves the ratio control valve in a direction to decrease transmission ratio. That is, the swashplate 24 is moved into stroke so that the variable unit handles the fluid from the fixed unit without driving the engine. Thus, the engine does not brake the vehicle. Engine speed decreases to low idle because the accelerator is released. As the speed signal decreases, the swashplate reduces stroke. As the vehicle coasts to a stop, the speed signal to the ratio control valve is discontinued.

In the speed sensor valve, it should be noted that when the valve is operated, the longitudinal stem passage 82 provides a feedback signal to the lower end of the valve stem from the valve outlet in opposition to the flyweights to aid in returning the valve toward balanced position. Similarly in the engine horsepower sensing valve 95, the longitudinal stem passage 123 supplies a feedback signal from the valve outlet to the right end of the valve stem to aid in returning the valve stem toward balanced position.

In the ratio control valve, the relationship of horsepower to speed is controlled in a manner to provide for minimum fuel consumption for the power requirement by controlling the piston areas in the ratio control valve and the spring values in the ratio control valve. A typical relationship of engine speed to engine horsepower for minimum fuel consumption is illustrated by a solid line curve 130 in the graph of FIG. 2. In contrast, it should be noted that the minimum fuel consumption curve includes engine speeds which are somewhat higher than those falling on a broken line curve 132 which is representative of speeds corresponding to maximum power.

In order to provide for positive braking under conditions where engine speed is maintained to brake the vehicle speed, a brake valve 135 is utilized in association with the switching valve 120. The brake valve includes a valve stem 136 which is normally positioned so that a valve land 137 blocks communication between a supply port 138 and a control port 139. The valve stem 136 is urged upwardly by a spring 140 engaging the lower end of the valve stem. In order to move the valve stem 136 downwardly, a coiled compression spring 142 engages the upper end of the valve stem and is subject to compression by a plunger 143 adapted to be moved by a brake pedal 145. When the valve stem 136 is moved downwardly by the action of the brake pedal 145, a reduced stem portion 146 establishes communication between the supply port 138 and the control port 139. When the brake valve is actuated, a feedback signal is provided to the lower end of the valve stem through a port 148 communicating with a piston 149 engaging the lower end of the valve stem 136.

Normally, the brake valve is maintained out of communication with the horsepower sensing valve 95 and the ratio control valve 45 by means of switching valve 120. The latter includes a valve stem 152 which is normally urged upwardly to the position illustrated by a coiled compression spring 153 engaging the lower end of the valve stem. When the valve stem is positioned as illustrated, a reduced stem portion 155 establishes communication between the horsepower sensing valve port 115 and the ratio control valve port 121 so that the horsepower sensing valve controls the ratio control valve. In such position, communication is blocked between the brake valve port 148 and the ratio control valve port 121 so that the brake valve does not affect the ratio control valve. The switching valve stem 152 is movable downwardly responsive to pressure in the brake valve port 139 to a position where the reduced stem portion 155 communicates the brake valve port 148 and the ratio control valve port 121, while communication is blocked between the horsepower sensing valve port 115 and the ratio control valve port 121. The horsepower sensing valve is thus disabled, while the brake valve is enabled to control the ratio control valve.

Operation of the brake valve has the effect of supplying fluid pressure in the supply port 138 to the control port 139. Pressure in the port 139 actuates the switching valve, disabling the horsepower sensing valve. Fluid pressure is supplied from the port 139 to the chamber 94 in the ratio control valve. The manual pressure signal on the engine brake pedal 145 is thus substituted for the horsepower signal in the ratio control valve. Presumably, the accelerator pedal is released. The momentum of the vehicle drives the fixed unit 18. The brake signal at the lower end of the ratio control valve moves the ratio control valve stem upwardly to a position where the supply port 60 communicates with the control port 57, decreasing the stroke of the variable unit 16. The reduced stroke results in increasing engine speed, increasing the capacity of the engine to absorb horsepower necessary for braking. As the braking pressure is relieved on the brake pedal, the ratio control valve tends to move downwardly to increase the stroke of the variable unit 16, reducing the braking capacity of the engine. As the momentum of the vehicle is absorbed by the engine, the engine speed is reduced, and the system returns toward neutral.

FIG. 3

FIG. 3 illustrates an alternative engine horsepower sensing valve 95' adapted for use in connection with an internal combustion engine where fuel flow to the combustion chambers is controlled by a throttle linkage which operates a carburetor valve or a diesel engine rack and injection system. In such an engine, a fuel control unit represented diagrammatically at 32' may include a throttle control arm 38' adapted for actuation by a link 39' subject to control by an accelerator pedal similar to that illustrated at 40 in FIG. 1. In an internal combustion engine of the type described, the throttle lever position is representative of the engine horsepower capacity at different speeds, and may be utilized somewhat as fuel rail pressure in a diesel engine is utilized in the system described in FIG. 1. In order to illustrate the relationship between the throttle position and engine horsepower capacity at minimum fuel consumption, a broken line curve 160 is included in FIG. 5, where engine horsepower is plotted on the abscissa versus throttle lever position, in degrees, plotted on the ordinate.

In order to transmit motion of the throttle lever 38' to the horsepower sensing valve 95', the lever 38' includes a crank arm 161 connected by a link 162 to a cam lever 163 pivotally mounted at 164 and including a cam surface 165 eccentric relative to the pivot axis 164.

The horsepower sensing valve 95' includes a valve member 168 which is normally biased by a spring 169 toward the position illustrated in FIG. 3, where communication is blocked between a pressure supply port 170 and a control port 172. The valve member 168 is adapted to be moved toward the right as viewed in FIG. 3 by a coiled compression spring 175 engaging the left end of the valve member and operable by a reciprocable plunger 176 engaging the cam surface 165. On movement of the valve member 168 toward the right as viewed in FIG. 3, a reduced central portion 178 on the valve stem is adapted to establish communication between the pressure supply port 170 and the control port 172. The latter port communicates with a passage 115', corresponding to that illustrated at 115 in FIG. 1, and leading to a ratio control valve through a switching valve similar to those described in connection with the circuit of FIG. 1. A feedback signal is provided from the valve outlet to the right end of the valve member 168 through a port 180.

In operation, movement of the throttle lever 38' is transmitted by the cam 165 to compress the spring 175 which provides a signal to the valve member 168 proportional to horsepower capcity of the engine for each throttle position. Movement of the valve member 168 toward the right allows the flow of fluid from the port 170 to the port 172, and the provision of a feedback signal to the right end of the valve member provides for a pressure value in the passage 115' corresponding to horsepower. The horsepower signal is utilized in a system like that illustrated in FIG. 1.

FIG. 4

FIG. 4 illustrates an alternative engine horsepower sensing valve 95'' adapted for use in connection with an internal combustion gasoline engine where use is made of intake manifold vacuum values for indicating engine horsepower capacity. In a naturally aspirated gasoline engine, where intake vacuum is established by the suction strokes of the pistons, intake manifold vacuum varies with different conditions of load and engine speed. For example, at low speeds and high torques, manifold vacuum drops below normal, that is, the pressure rises, whereas at high speeds and low loads, the manifold vacuum increases, that is, the pressure drops, At minimum fuel consumption, the manifold vacuum remains fairly constant at different horsepower levels, as illustrated in a dot-dash line 185 in FIG. 5 where engine horsepower is plotted against intake manifold vacuum represented in inches of mercury of negative values.

The horespower sensing valve 95'' includes a valve member having spaced lands 186, 187 and 188, with intervening reduced portions 189 and 190. The valve stem is normally positioned as illustrated in FIG. 4 where the central land 187 blocks communication between a pressure supply port 192 and a control port 193 communicating with a passage 115'' corresponding to that illustrated at 115 in FIG. 1. The reduced stem portion 190 includes a radial port 195 communicating with a longitudinal stem passage 196 leading to the right end of the valve member where the valve housing communicates with a drain 197. The passage 196 extends completely through the valve stem from one end to the other in order to relieve a spring chamber 198 of leakage fluid. A coiled compression spring 199 engages the left end of the valve member, and a valve extension 202 is connected with a diaphragm 203 in a vacuum chamber 204. The latter chamber is adapted for connection with the engine intake manifold through a passage 205.

In operation, he manifold vacuum remains fairly constant, as illustrated in FIG. 5, at different horsepower levels for minimum fuel consumption. If the vacuum fluctuates from normal indicating departures from minimum fuel consumption conditions, the valve spool will shift right or left to control the ratio control valve in a manner to cause the engine to speed up or slow down until the vacuum input matches the required spring force. Thus, the manifold vacuum horsepower sensing valve produces a variable output even though the normal desired input should be held constant.

We claim:

1. A drive, comprising,
    a. an engine having fuel supply means for controlling engine horsepower,
    b. a hydrostatic transmission driven by the engine including means for varying the transmission ratio,
    c. a ratio control valve for controlling the ratio varying means,
    d. means for applying a bias to the ratio control valve porportional to engine speed, and
    e. means for applying an opposing fluid bias to the ratio control valve proportional to engine horsepower.

2. A drive, comprising, an engine having fuel supply means for controlling engine horsepower, a hydrostatic transmission driven by the engine including means for varying the transmission ratio, a ratio control valve for controlling the ratio varying means, means for applying a bias to the ratio control valve porportional to engine speed, means for applying an opposing fluid bias to the ratio control valve proportional to engine horsepower, and means for applying an opposing fluid bias to the ratio control valve alternative to the engine horsepower bias for braking.

3. A drive, comprising, an engine having fuel supply means for controlling engine horsepower, a hydrostatic transmission driven by the engine including means for varying the transmission ratio, a ratio control valve for controlling the ratio varying means, means for applying a bias to the ratio control valve proportional to engine speed, and means for applying an opposing fluid bias to the ratio control valve proportional to engine horsepower including means providing a fluid chamber adjacent the valve, a source of control fluid, a horsepower valve controlling flow of control fluid from the source to the fluid chamber, and means for sensing engine horsepower and controlling the horsepower valve.

4. A drive as defined in claim 3, including means proportional to horsepower for applying a first signal to the horsepower valve, and means for supplying a feedback signal to the horsepower valve proportional to pressure in said fluid chamber and in opposition to the horsepower signal.

5. A drive as defined in claim 3, wherein the fuel supply means comprises means for supplying fuel at pressure proportional to engine power, and the means for sensing engine horsepower comprises means for sensing fuel supply pressure.

6. A drive as defined in claim 3, wherein the fuel supply means comprises a throttle control, the position of which is proportional to engine power, and the means for sensing engine horsepower comprises means responsive to the position of the throttle control.

7. A drive as defined in claim 3, wherein the fuel supply means establishes fuel intake vacuum dependent on engine power, and the means for sensing engine horsepower comprises means responsive to fuel intake vacuum.

8. A drive as defined in claim 3, including brake valve means controlling flow of control fluid from the source to the fluid chamber, and manually operable means for controlling the brake valve means.

9. A drive, comprising,
    a. a hydrostatic transmission including first and second hydraulic units connected in closed hydraulic circuit,
    b. an input shaft driving the hydrostatic transmission,
    c. an output shaft driven by the hydrostatic transmission,
    d. an engine for driving the input shaft,
    e. fuel control means for establishing engine horsepower,
    f. means for varying the displacement of one of the hydraulic units to vary the transmission ratio,
    g. a ratio control valve for controlling the displacement varying means,
    h. means responsive to the speed of the engine for applying a predetermined fluid bias to the ratio control valve proportional to engine speed,
    i. a horsepower valve controlling fluid flow for actuating the ratio control valve proportional to engine horsepower in opposition to the speed bias, and
    j. means for sensing engine horsepower and controlling the horsepower valve.

10. A drive as defined in claim 9, wherein the engine speed responsive means comprises a valve having an inlet communicating with a source of control fluid under pressure, an outlet for supplying said fluid bias to the ratio control valve, and a valve member controlling communication between the inlet and outlet responsive to engine speed.

11. A drive as defined in claim 9, wherein the ratio control valve includes a valve member for controlling flow of fluid relative to the displacement varying means, a spring acting on the valve member in opposition to the speed bias, and a plunger engaging the spring for establishing a bias proportional to engine horsepower responsive to the horsepower valve.

12. A drive as defined in claim 11, including stop means limiting movement of the plunger to limit the maximum horsepower.

13. A drive as defined in claim 11, wherein the horsepower valve comprises an inlet communicating with a source of control fluid under pressure, an outlet for supplying fluid to the ratio control valve plunger, and a valve member controlling communication between the inlet and outlet responsive to the engine horsepower sensing means.

14. A drive as defined in claim 13, including means for providing a feedback signal to the horsepower valve member from the ratio control plunger in opposition to the horsepower sensing means.

15. A drive as defined in claim 14, wherein the fuel control means comprises a pump unit driven by the engine for supplying fuel to the engine at pressure proportional to engine power, and the means for sensing engine horsepower comprises means for supplying fuel supply pressure to the horsepower valve member, and spring means acting on the horsepower valve member in aid of fuel supply pressure.

16. A drive as defined in claim 14, wherein the fuel control means comprises throttle means controlling fuel flow and positionable proportional to engine horsepower, and the means for sensing engine horsepower comprises a spring acting on the horsepower valve and a plunger engaging the spring and positionable proportional to movement of the throttle means.

17. A drive as defined in claim 13, wherein the fuel control means establishes fuel supply pressure proportional to engine power, and the means for sensing engine horsepower comprises means responsive to fuel pressure.

18. A drive as defined in claim 13, wherein the fuel control means includes an intake manifold at negative pressure dependent on engine horsepower, and the means for sensing engine horsepower comprises a diaphragm sensitive to manifold vacuum and connected to the horsepower valve member.

19. A drive as defined in claim 13, including brake valve means controlling flow of control fluid from the source to the ratio control valve plunger, and manually operable means for controlling the brake valve means.

20. A drive as defined in claim 11, including brake valve meas controlling flow of control fluid from the source to the ratio control valve plunger to actuate the plunger proportional to braking and disable the horsepower valve, spring means controlling the brake valve means, and a manually operable member engaging the spring means to control the brake valve means.

21. A drive as defined in claim 19, wherein the brake valve means comprises a braking valve responsive to said manually operable means, and a switching valve responsive to the braking valve and controlling flow between the braking valve and the ratio control valve plunger.

22. A hydrostatic transmission, comprising,
a. an input shaft,
b. an output shaft,
c. a first hydraulic unit connected to the input shaft,
d. a second hydraulic unit connected to the output shaft,
e. conduit means interconnecting the hydraulic units for delivering fluid under pressure from one to the other and returning fluid from the other to the one,
f. an engine for driving the input shaft including fuel control means for controlling engine power,
g. fluid operable means for varying the displacement of one of the hydraulic units to vary the speed of the output shaft relative to the speed of the input shaft,
h. a ratio control valve, including
  h-1. a valve member for controlling flow of fluid relative to the displacement varying means,
  h-2. a spring acting on the valve member, and
  h-3. a plunger engaging the spring for establishing a bias proportional to engine horsepower,
i. a horsepower valve, including
  i-1. an inlet communicating with a source of control fluid,
  i-2. an outlet for supplying fluid to the ratio control valve plunger, and
  i-3. a valve member controlling communication between the inlet and outlet,
j. means for sensing horsepower and controlling the horsepower valve member, and
k. means responsive to the speed of the engine and providing a fluid pressure signal proportional to engine speed to the ratio control valve in opposition to the horsepower bias for establishing a transmission ratio for controlling engine speed.

23. A transmission as defined in claim 22, wherein the engine speed responsive means comprises a valve having an inlet communicating with a source of charge fluid under pressure, an outlet for supplying said fluid pressure signal to the governor valve and a valve member controlling communication between the inlet and outlet and responsive to the speed of the engine for supplying bias fluid under pressure to the valve outlet proportional to engine speed.

24. A transmission as defined in claim 23, wherein the engine speed responsive valve includes means for constantly biasing the valve member in a direction to block communication between the valve inlet and the valve outlet, means responsive to the speed of the engine for biasing the valve member in a direction to communicate the valve inlet and valve outlet, and means providing a feedback signal when the valve is open to aid the constant bias.

25. A drive as defined in claim 22, wherein the fuel control means establishes fuel control pressure proportional to engine power, and the means for sensing engine horsepower comprises means responsive to fuel pressure.

26. A drive as defined in claim 22, wherein the fuel control means comprises a throttle control positionable proportional to engine power, and the means for sensing engine horsepower comprises means responsive to the position of the throttle control.

27. A drive as defined in claim 22, including brake valve means controlling flow of control fluid relative to the ratio control valve plunger, and manually operable means for controlling the brake valve means.

28. A drive as defined in claim 22, including a stop limiting movement of the ratio control valve plunger to limit maximum horsepower and thereby limit maximum engine speed.

29. A drive as defined in claim 22, including a brake valve for selectively supplying fluid to the ratio control plunger, a spring engaging the brake valve, a manually operable plunger for compressing the brake valve spring to supply a braking signal to the ratio control valve, a feedback passage for supplying fluid from the brake valve outlet to the brake valve in opposition to the spring, and a switching valve normally blocking communication between the brake valve and the ratio control valve and responsive to operation of the brake valve to communicate the brake valve with the ratio control valve.

* * * * *